United States Patent
Barbier et al.

(12)

(10) Patent No.: US 8,274,486 B2
(45) Date of Patent: Sep. 25, 2012

(54) DIAMOND PATTERN ON A SINGLE LAYER

(75) Inventors: Fabrice Barbier, San Carlos, CA (US);
Farouk Zabel, San Diego, CA (US)

(73) Assignee: Flextronics AP, LLC, Broomfield, CO (US)

( * ) Notice: Subject to any disclaimer, the term of this patent is extended or adjusted under 35 U.S.C. 154(b) by 513 days.

(21) Appl. No.: 12/341,363

(22) Filed: Dec. 22, 2008

(65) Prior Publication Data

US 2010/0156810 A1 Jun. 24, 2010

(51) Int. Cl.
*G06F 3/041* (2006.01)
(52) U.S. Cl. .......... 345/173; 345/103; 345/104; 345/87; 345/71
(58) Field of Classification Search ............... None
See application file for complete search history.

(56) References Cited

U.S. PATENT DOCUMENTS

| | | |
|---|---|---|
| 4,290,052 A | 9/1981 | Eichelberger et al. |
| 4,550,221 A | 10/1985 | Mabusth |
| 5,062,198 A | 11/1991 | Sun |
| 5,379,057 A | 1/1995 | Clough et al. |
| 5,459,463 A | 10/1995 | Gruaz et al. |
| 5,488,204 A | 1/1996 | Mead et al. |
| 5,495,077 A | 2/1996 | Miller et al. |
| 5,543,588 A | 8/1996 | Bisset et al. |
| 5,543,590 A | 8/1996 | Gillespie et al. |
| 5,543,592 A | 8/1996 | Gaultier et al. |
| 5,650,597 A | 7/1997 | Redmayne |
| 5,675,362 A | 10/1997 | Clough et al. |
| 5,730,165 A | 3/1998 | Philipp |
| 5,825,352 A | 10/1998 | Bisset et al. |
| 5,841,078 A | 11/1998 | Miller et al. |
| 5,854,450 A | 12/1998 | Kent |
| 5,854,625 A | 12/1998 | Frisch et al. |
| 5,861,583 A | 1/1999 | Schediwy et al. |
| 5,880,411 A | 3/1999 | Gillespie et al. |
| 5,920,310 A | 7/1999 | Faggin et al. |

(Continued)

FOREIGN PATENT DOCUMENTS

CN 1838151 A 9/2006

(Continued)

OTHER PUBLICATIONS

Adler, R., et al., An Economical Touch Panel using SAW Absorption, IEEE Transactions on Ultrasonics, Ferroelectrics and Frequency Control, Mar. 1987, vol. 34, No. 2, pp. 195-201.

(Continued)

*Primary Examiner* — Muhammad N Edun
(74) *Attorney, Agent, or Firm* — Marsh Fischmann & Breyfogle LLP

(57) ABSTRACT

A touch screen assembly and method of manufacturing thereof that includes a single layer of conductive material is provided. The conductive material is configured to include a horizontal pattern and a vertical pattern of electrodes, with one of the patterns having gaps between the electrodes, such that the electrodes in the horizontal pattern do not come into direct contact with electrodes in the vertical pattern. To provide a connection between the electrodes separated by gaps in the interrupted pattern, an insulating material is placed onto the gaps over the uninterrupted pattern, and a printable and electrically conductive connector is positioned over the insulating material and functions to couple at least two electrodes together. In one embodiment, the conductive connector includes carbon nanotubes.

22 Claims, 4 Drawing Sheets

U.S. PATENT DOCUMENTS

| | | |
|---|---|---|
| 5,940,065 A | 8/1999 | Babb et al. |
| 5,943,052 A | 8/1999 | Allen et al. |
| 6,091,406 A | 7/2000 | Kambara et al. |
| 6,188,391 B1 | 2/2001 | Seely et al. |
| 6,236,391 B1 | 5/2001 | Kent et al. |
| 6,288,707 B1 | 9/2001 | Philipp |
| 6,297,811 B1 | 10/2001 | Kent et al. |
| 6,373,474 B1 | 4/2002 | Katabami |
| 6,379,509 B2 | 4/2002 | Choi et al. |
| 6,380,929 B1 | 4/2002 | Platt |
| 6,380,931 B1 | 4/2002 | Gillespie et al. |
| 6,414,671 B1 | 7/2002 | Gillespie et al. |
| 6,441,809 B2 | 8/2002 | Kent et al. |
| 6,452,514 B1 | 9/2002 | Philipp |
| 6,466,036 B1 | 10/2002 | Philipp |
| 6,488,981 B1 | 12/2002 | Richter et al. |
| 6,492,979 B1 | 12/2002 | Kent et al. |
| 6,504,530 B1 | 1/2003 | Wilson et al. |
| 6,504,583 B2 | 1/2003 | Li et al. |
| 6,506,983 B1 | 1/2003 | Babb et al. |
| 6,535,200 B2 | 3/2003 | Philipp |
| 6,549,193 B1 | 4/2003 | Huang et al. |
| 6,555,235 B1 | 4/2003 | Aufderheide et al. |
| 6,587,097 B1 | 7/2003 | Aufderheide et al. |
| 6,723,929 B2 | 4/2004 | Kent |
| 6,738,051 B2 | 5/2004 | Boyd et al. |
| 6,750,852 B2 | 6/2004 | Gillespie et al. |
| 6,781,579 B2 | 8/2004 | Huang et al. |
| 6,784,873 B1 | 8/2004 | Boesen et al. |
| 6,809,280 B2 | 10/2004 | Divigalpitiya et al. |
| 6,819,316 B2 | 11/2004 | Schulz et al. |
| 6,825,833 B2 | 11/2004 | Mulligan et al. |
| 6,842,171 B2 | 1/2005 | Richter et al. |
| 6,856,259 B1 | 2/2005 | Sharp |
| 6,904,570 B2 | 6/2005 | Foote et al. |
| 6,927,761 B2 | 8/2005 | Badaye et al. |
| 6,943,705 B1 | 9/2005 | Bolender et al. |
| 6,961,049 B2 | 11/2005 | Mulligan et al. |
| 6,970,160 B2 | 11/2005 | Mulligan et al. |
| 6,977,646 B1 | 12/2005 | Hauck et al. |
| 6,993,607 B2 | 1/2006 | Philipp |
| 7,000,474 B2 | 2/2006 | Kent |
| 7,006,081 B2 | 2/2006 | Kent et al. |
| 7,030,860 B1 | 4/2006 | Hsu et al. |
| 7,061,475 B2 | 6/2006 | Kent |
| 7,102,621 B2 | 9/2006 | Roberts |
| 7,109,976 B2 | 9/2006 | Cobian |
| 7,109,978 B2 | 9/2006 | Gillespie et al. |
| 7,129,935 B2 | 10/2006 | Mackey |
| 7,148,704 B2 | 12/2006 | Philipp |
| 7,148,882 B2 | 12/2006 | Kamrath et al. |
| 7,151,532 B2 | 12/2006 | Schulz |
| 7,154,481 B2 | 12/2006 | Cross et al. |
| 7,158,122 B2 | 1/2007 | Roberts |
| 7,176,897 B2 | 2/2007 | Roberts |
| 7,176,902 B2 | 2/2007 | Peterson, Jr. et al. |
| 7,183,948 B2 | 2/2007 | Roberts |
| 7,190,350 B2 | 3/2007 | Roberts |
| 7,190,352 B2 | 3/2007 | Ling et al. |
| 7,196,694 B2 | 3/2007 | Roberts |
| 7,202,859 B1 | 4/2007 | Speck et al. |
| 7,212,189 B2 | 5/2007 | Shaw et al |
| 7,227,538 B2 | 6/2007 | Geaghan et al. |
| 7,236,161 B2 | 6/2007 | Geaghan et al. |
| 7,253,643 B1 | 8/2007 | Seguine |
| 7,253,809 B2 | 8/2007 | Boyd et al. |
| 7,254,775 B2 | 8/2007 | Geaghan et al. |
| 7,256,714 B2 | 8/2007 | Philipp |
| 7,277,087 B2 | 10/2007 | Hill et al. |
| 7,279,647 B2 | 10/2007 | Philipp |
| 7,295,190 B2 | 11/2007 | Philipp |
| 7,298,367 B2 | 11/2007 | Geaghan et al. |
| 7,303,809 B2 | 12/2007 | Choi et al. |
| 7,307,624 B2 | 12/2007 | Geaghan et al. |
| 7,315,300 B2 | 1/2008 | Hill et al. |
| 7,327,352 B2 | 2/2008 | Keefer et al. |
| 7,339,579 B2 | 3/2008 | Richter et al. |
| 7,515,140 B2 | 4/2009 | Philipp |
| 7,821,425 B2 | 10/2010 | Philipp |
| 7,821,502 B2 | 10/2010 | Hristov |
| 7,825,905 B2 | 11/2010 | Philipp |
| 7,903,092 B2 | 3/2011 | Philipp |
| 7,932,898 B2 | 4/2011 | Philipp et al. |
| 7,945,297 B2 | 5/2011 | Philipp |
| 7,969,330 B2 | 6/2011 | Philipp |
| 2001/0026330 A1 | 10/2001 | Oh |
| 2002/0030666 A1 | 3/2002 | Philipp |
| 2002/0145593 A1 | 10/2002 | Boyd et al. |
| 2002/0191029 A1 | 12/2002 | Gillespie et al. |
| 2003/0001826 A1 | 1/2003 | Richter et al. |
| 2003/0095111 A1 | 5/2003 | Song et al. |
| 2003/0103043 A1 | 6/2003 | Mulligan et al. |
| 2003/0132922 A1 | 7/2003 | Philipp |
| 2003/0137498 A1 | 7/2003 | Huang et al. |
| 2003/0184523 A1 | 10/2003 | Badaye et al. |
| 2003/0205450 A1 | 11/2003 | Divigalpitiya et al. |
| 2004/0008129 A1 | 1/2004 | Philipp |
| 2004/0061687 A1 | 4/2004 | Kent et al. |
| 2004/0100448 A1 | 5/2004 | Moshrefzadeh |
| 2004/0104826 A1 | 6/2004 | Philipp |
| 2004/0135773 A1 | 7/2004 | Bang et al. |
| 2004/0178997 A1 | 9/2004 | Gillespie et al. |
| 2004/0188150 A1 | 9/2004 | Richard et al. |
| 2004/0189882 A1 | 9/2004 | Jeong et al. |
| 2004/0252109 A1 | 12/2004 | Trent, Jr. et al. |
| 2005/0024341 A1 | 2/2005 | Gillespie et al. |
| 2005/0035953 A1 | 2/2005 | Woolley et al. |
| 2005/0041018 A1 | 2/2005 | Philipp |
| 2005/0052429 A1 | 3/2005 | Philipp |
| 2005/0078027 A1 | 4/2005 | Philipp |
| 2005/0110766 A1 | 5/2005 | Kent et al. |
| 2005/0110767 A1 | 5/2005 | Gomes et al. |
| 2005/0162408 A1 | 7/2005 | Martchovsky |
| 2005/0174335 A1 | 8/2005 | Kent et al. |
| 2005/0179673 A1 | 8/2005 | Philipp |
| 2005/0246459 A1 | 11/2005 | Philipp |
| 2005/0260338 A1 | 11/2005 | Chien |
| 2006/0038793 A1 | 2/2006 | Philipp |
| 2006/0092142 A1 | 5/2006 | Gillespie et al. |
| 2006/0097991 A1 | 5/2006 | Hotelling et al. |
| 2006/0132453 A1 | 6/2006 | Boyd et al. |
| 2006/0132462 A1 | 6/2006 | Geaghan |
| 2006/0139340 A1 | 6/2006 | Geaghan |
| 2006/0187214 A1 | 8/2006 | Gillespie et al. |
| 2006/0187216 A1 | 8/2006 | Trent, Jr. et al. |
| 2006/0192690 A1 | 8/2006 | Philipp |
| 2006/0202969 A1 | 9/2006 | Hauck |
| 2006/0202970 A1 | 9/2006 | Lii et al. |
| 2006/0207806 A1 | 9/2006 | Philipp |
| 2006/0238513 A1 | 10/2006 | Philipp |
| 2006/0274047 A1 | 12/2006 | Spath et al. |
| 2006/0274055 A1 | 12/2006 | Reynolds et al. |
| 2006/0279548 A1 | 12/2006 | Geaghan |
| 2006/0284836 A1 | 12/2006 | Philipp |
| 2007/0002192 A1 | 1/2007 | Nishino et al. |
| 2007/0008299 A1 | 1/2007 | Hristov |
| 2007/0013671 A1 | 1/2007 | Zadesky et al. |
| 2007/0026089 A1 | 2/2007 | Hu |
| 2007/0052690 A1 | 3/2007 | Roberts |
| 2007/0062739 A1 | 3/2007 | Philipp et al. |
| 2007/0074914 A1 | 4/2007 | Geaghan et al. |
| 2007/0085838 A1 | 4/2007 | Ricks et al. |
| 2007/0091076 A1 | 4/2007 | Schulz |
| 2007/0103446 A1 | 5/2007 | Chien et al. |
| 2007/0109274 A1 | 5/2007 | Reynolds |
| 2007/0159561 A1 | 7/2007 | Chien |
| 2007/0176906 A1 | 8/2007 | Warren |
| 2007/0188476 A1 | 8/2007 | Bayramoglu et al. |
| 2007/0222766 A1 | 9/2007 | Bolender |
| 2007/0229466 A1 | 10/2007 | Peng et al. |
| 2007/0229468 A1 | 10/2007 | Peng et al. |
| 2007/0229470 A1 | 10/2007 | Snyder et al. |
| 2007/0236475 A1 | 10/2007 | Wherry |
| 2007/0236478 A1 | 10/2007 | Geaghan et al. |
| 2007/0236618 A1 | 10/2007 | Maag et al. |
| 2007/0247443 A1 | 10/2007 | Philipp |
| 2007/0257893 A1 | 11/2007 | Philipp et al. |

| | | |
|---|---|---|
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0264844 A1 | 11/2007 | Hu |
| 2007/0268265 A1 | 11/2007 | XiaoPing |
| 2007/0268266 A1 | 11/2007 | XiaoPing |
| 2007/0268276 A1 | 11/2007 | Kent et al. |
| 2007/0273560 A1 | 11/2007 | Hua et al. |
| 2007/0273561 A1 | 11/2007 | Philipp |
| 2007/0279395 A1 | 12/2007 | Philipp et al. |
| 2007/0291009 A1 | 12/2007 | Wright et al. |
| 2007/0291016 A1 | 12/2007 | Philipp |
| 2007/0296709 A1 | 12/2007 | GuangHai |
| 2008/0001925 A1 | 1/2008 | XiaoPing |
| 2008/0007434 A1 | 1/2008 | Hristov |
| 2008/0007534 A1 | 1/2008 | Peng et al. |
| 2008/0012832 A1 | 1/2008 | GuangHai |
| 2008/0018618 A1 | 1/2008 | Hill et al. |
| 2008/0024461 A1 | 1/2008 | Richter et al. |
| 2008/0029292 A1 | 2/2008 | Takayama et al. |
| 2008/0041641 A1 | 2/2008 | Geaghan et al. |
| 2008/0042994 A1 | 2/2008 | Gillespie et al. |
| 2008/0048978 A1 | 2/2008 | Trent, Jr. et al. |
| 2008/0048997 A1 | 2/2008 | Gillespie et al. |
| 2008/0062139 A1 | 3/2008 | Hotelling et al. |
| 2008/0074398 A1 | 3/2008 | Wright |
| 2008/0111714 A1 | 5/2008 | Kremin |
| 2008/0122802 A1 | 5/2008 | Furuhashi et al. |
| 2008/0138589 A1 | 6/2008 | Wakabayashi et al. |
| 2008/0142352 A1 | 6/2008 | Wright |
| 2008/0143683 A1 | 6/2008 | Hotelling |
| 2008/0150905 A1 | 6/2008 | Grivna et al. |
| 2008/0150906 A1 | 6/2008 | Grivna |
| 2008/0158181 A1 | 7/2008 | Hamblin et al. |
| 2008/0158183 A1 | 7/2008 | Hotelling et al. |
| 2008/0165139 A1 | 7/2008 | Hotelling et al. |
| 2008/0165158 A1 | 7/2008 | Hotelling et al. |
| 2008/0264699 A1 | 10/2008 | Chang et al. |
| 2008/0309635 A1 | 12/2008 | Matsuo |
| 2009/0085891 A1 | 4/2009 | Yang et al. |
| 2009/0135151 A1 | 5/2009 | Sun |
| 2009/0160817 A1 | 6/2009 | Wu et al. |
| 2009/0160824 A1 | 6/2009 | Chih-Yung et al. |
| 2009/0167710 A1 * | 7/2009 | Jiang et al. ............... 345/173 |
| 2009/0194344 A1 | 8/2009 | Harley et al. |
| 2009/0236151 A1 | 9/2009 | Yeh et al. |
| 2009/0309850 A1 | 12/2009 | Yang |
| 2010/0024573 A1 | 2/2010 | Daverman et al. |
| 2010/0026655 A1 | 2/2010 | Harley |
| 2010/0045625 A1 * | 2/2010 | Yang et al. ............... 345/173 |
| 2010/0066700 A1 | 3/2010 | Mozdzyn |
| 2010/0073319 A1 * | 3/2010 | Lyon et al. ............... 345/174 |
| 2010/0085326 A1 | 4/2010 | Anno |
| 2010/0271330 A1 | 10/2010 | Philipp |
| 2011/0012845 A1 | 1/2011 | Rothkopf et al. |
| 2011/0157085 A1 | 6/2011 | Philipp |

FOREIGN PATENT DOCUMENTS

| | | |
|---|---|---|
| CN | 101122839 A | 2/2008 |
| JP | 2004280720 A | 10/2004 |
| KR | 200229845 Y1 | 7/2001 |
| KR | 10-2005-0100274 A | 10/2005 |
| KR | 10-2007-0081902 A | 8/2007 |
| KR | 100907512 B1 | 7/2009 |

OTHER PUBLICATIONS

Touchscreenguide.com (http://www.touchscreenguide.com/touchscreen/res.html), as printed from the Internet on Oct. 28, 2011, 1 pg.

* cited by examiner

DIAMOND PATTERN ON A SINGLE LAYER

BACKGROUND

As computers and other electronic devices become more popular, touch-sensing systems are becoming more prevalent as a means for inputting data. For example, touch-sensing systems can be found in automatic teller machines, personal digital assistants, casino game machines, mobile phones, and numerous other applications.

Capacitive touch sensing is a widely used technique in touch screen industries. Capacitive touch sensors are mainly divided in two groups, namely, continuous capacitive sensors and discontinuous (patterned) capacitive sensors. In a continuous capacitive sensor, the sensor includes a sheet of conducting thin film that is electrically excited from four corners of the touch screen. The signals induced by a user's touch are transmitted from the corners to a controller, where they are decoded and translated into coordinates. In a typical patterned capacitive touch screen, the sensor may include one or more series of parallel conductive bars that are driven from one or both ends with an excitation signal from a controller. The signals induced by a user's touch may be transmitted to the controller with the same lead lines that excite the sensor bars. These signals may then be decoded in the controller and the touch coordinates may be reported to a computer.

Touch sensors utilizing more than one patterned sensing layer are often used to determine the coordinates of a touch with high accuracy, provided that the sensing layers have a suitable pattern geometry. One example of a touch screen assembly 10 that includes two patterned conductive layers 12 and 14 is shown in FIG. 1A and FIG. 1B. The patterned conductive layers 12 and 14 may be made from a transparent conductive material, such as indium tin oxide (ITO), and each layer is generally disposed on a transparent substrate (not shown). Each row of conducting elements of each of the sensor layers 12 and 14 includes a series of diamond-shaped electrodes that are connected to each other with short strips of relatively narrow rectangles. A dielectric layer 16 separates the two conductive layers 12 and 14, and serves to prevent them from coming into direct contact with each other. As an example, the dielectric layer 16 may include an adhesive manufactured from any non-conductive, transparent material.

As shown, the end of each row of the two patterned conductive layers 12 and 14 is coupled to one of a set of lead lines 18 that are in turn coupled to a controller 20. The controller 20 may include circuitry for providing excitation currents to the capacitive sensors 12 and 14 and for detecting signals generated by the sensors. Further, the controller 20 may include logic for processing the signals and conveying touch information to another part of an electronic device, such as a processor.

It is against this background that the systems and methods for providing a diamond pattern on a single layer described herein have been invented.

SUMMARY

The following embodiments and aspects of thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

According to a first aspect, a touch panel assembly is provided that includes a patterned layer of conductive material organized into a plurality of rows of conductive electrodes and a plurality of columns of conductive electrodes, wherein the conductive electrodes in each row of the plurality of rows are continuous, and the conductive electrodes in each column of the plurality of columns are discontinuous. The touch panel assembly also includes an insulating material disposed over a portion of the conductive material that is at least part of one of the plurality of rows, and a printable and conductive connector disposed over the insulating material and operable to electrically couple two conductive electrodes in one column of the plurality of columns together.

According to a second aspect, a method for manufacturing a touch panel assembly is provided. The method includes providing a substrate, and forming a layer of transparent conductive material on the substrate. The method further includes etching the conductive material to form a pattern that includes a plurality of rows that each include a plurality of electrodes, and a plurality of columns that each include a plurality of electrodes, wherein the plurality electrodes in each row of the plurality of rows are each coupled together by a strip of the conductive material, and wherein the plurality of electrodes in each column of the plurality of columns are not coupled together by the conductive material. Further, the method includes printing an insulating material aligned over at least a portion of each of the strips of the conductive material, and printing an electrically conductive connector over at least a portion of the insulating material such that at least two of the electrodes are coupled together.

According to a third aspect, a touch panel assembly is provided that includes a single patterned layer of conductive material that includes a plurality of electrodes, wherein at least two of the electrodes are not coupled together by the conductive material. The touch panel assembly also includes an insulating material disposed over a portion of the conductive material that connects two others of the electrodes together, and a printable and conductive connector disposed over the insulating material and operable to electrically couple two electrodes together.

In addition to the exemplary aspects and embodiments described above, further aspects and embodiments will become apparent by reference to the drawings and by study of the following descriptions.

DETAILED DESCRIPTION

Figure 1A:
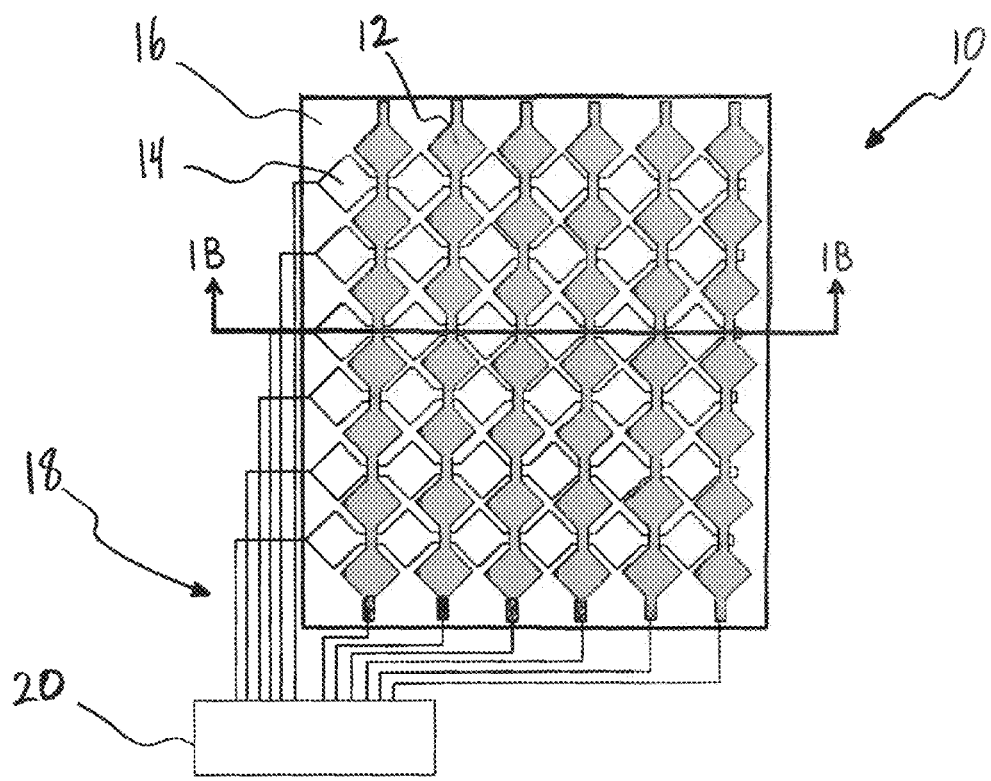
FIGS. 1A and 1B illustrate a top view and cross-sectional view of a prior art capacitive touch sensor assembly.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Figure 2:
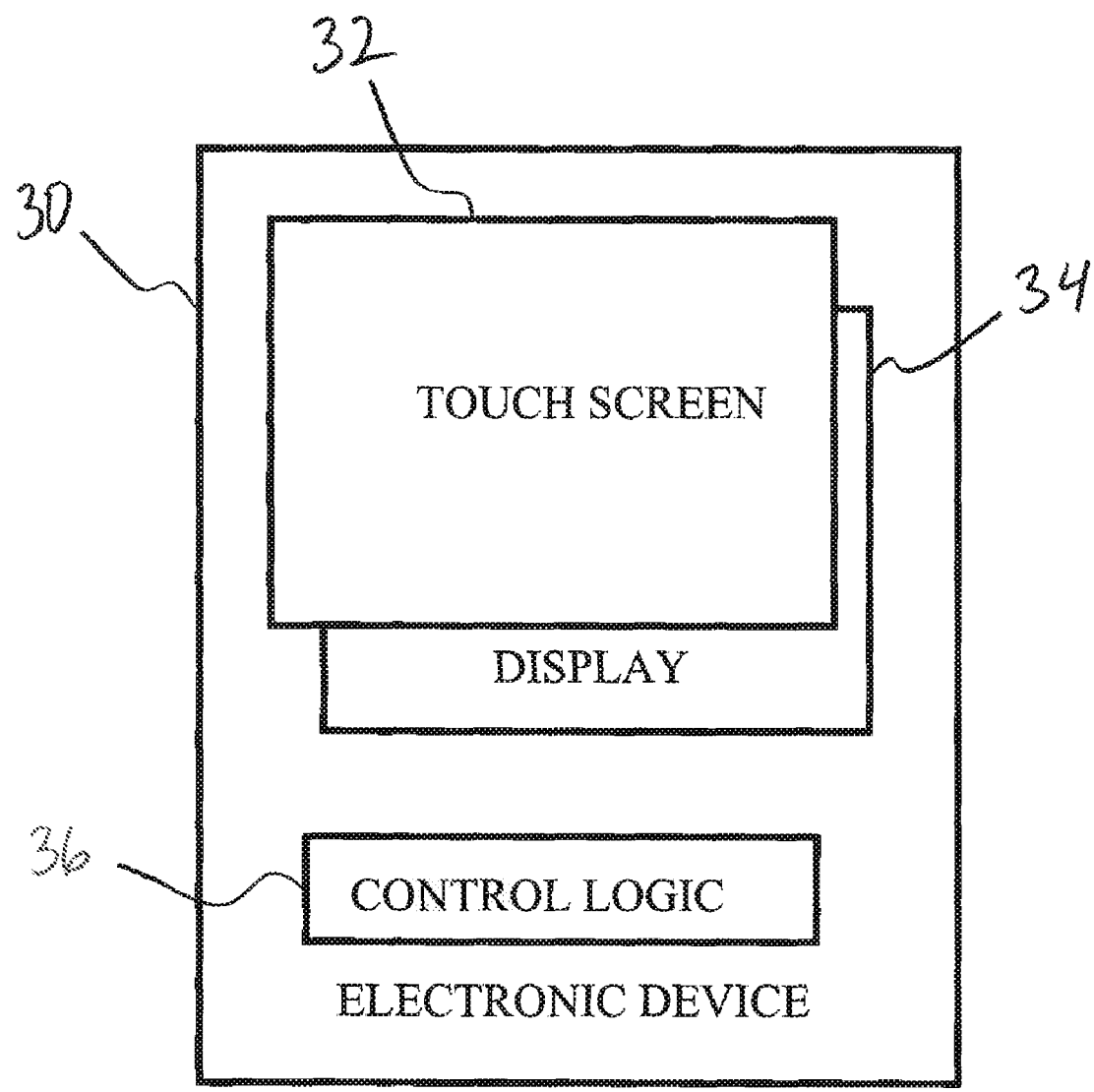
FIG. 2 illustrates an electronic device that incorporates an exemplary touch screen sensor assembly.

FIG. 2 illustrates an electronic device 30 that incorporates an exemplary touch screen sensor assembly 32. The electronic device 30 may be any device that incorporates a touch screen, such as an automatic teller machine (ATM), a personal digital assistant (PDA), a casino game machine, a mobile phone, a computer, or any other electronic device. The touch screen sensor assembly 32 may include a single layer of transparent patterned conductive material, such as ITO, that is disposed on a substrate. The touch screen sensor assembly 32 may also be coupled to control logic 36 that is operable to excite the conductive material and to sense touches on or near the touch screen sensor assembly 32. As an example, the control logic 36 may include a commercial touch screen controller or an application specific integrated circuit (ASIC). The touch sensor assembly 32 may overlay a display 34, which may be any type of display, such as an LCD display.

Figure 1B:
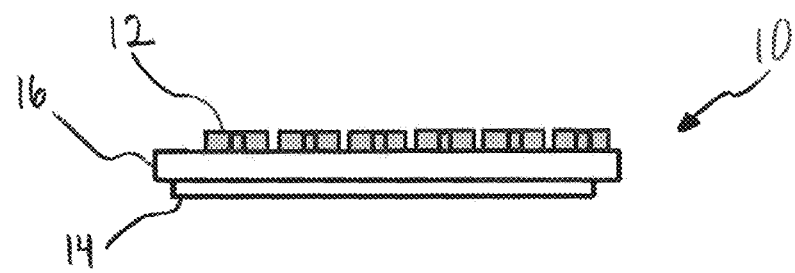
Figure 3A:
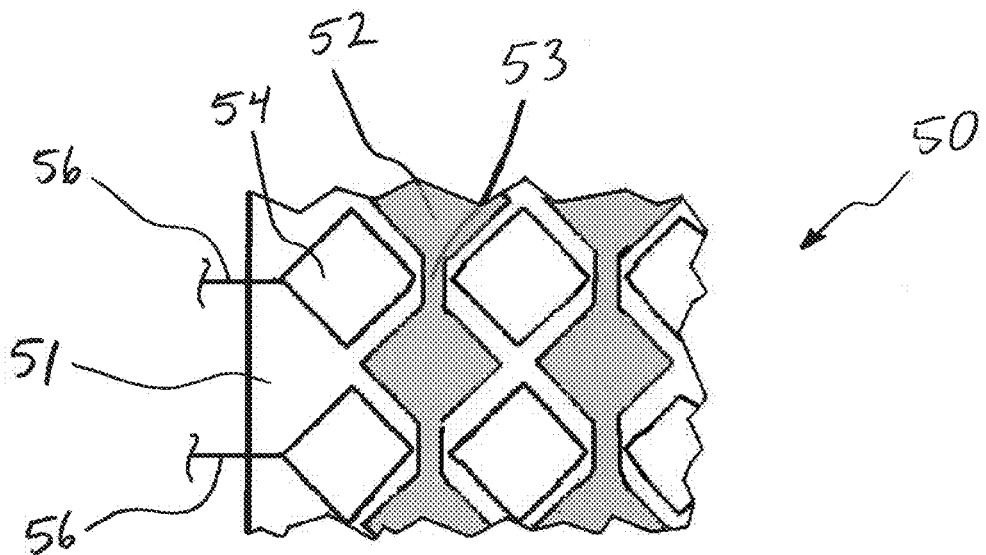
FIGS. 3A and 3B illustrate one embodiment of an exemplary touch screen sensor assembly.
Figure 3B:
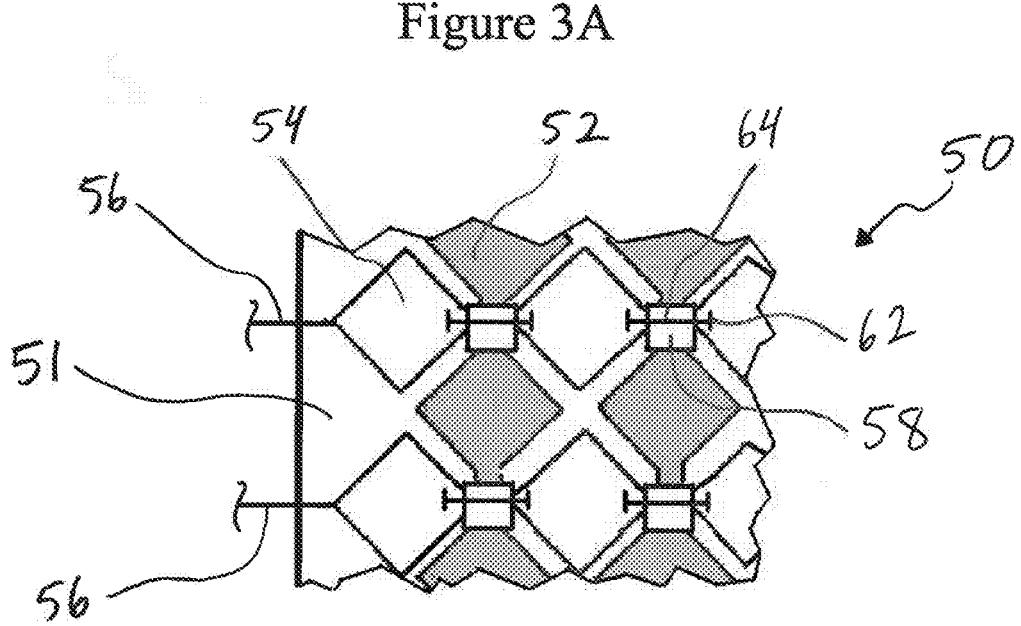

FIGS. 3A and 3B show one embodiment of an exemplary touch screen sensor assembly 50. For illustration purposes, only a portion of the assembly 50 is shown, as indicated by the jagged-edged lines. As shown in FIG. 3A, the assembly 50 includes a single layer of transparent conductive material (e.g., ITO) that is arranged in a pattern of diamond-shaped electrodes 52 and 54. The transparent conductive material may be disposed on a transparent substrate 51, which may include a polymer (e.g., polyethylene terephthalate (PET) or other plastic), glass, or other suitable material. The pattern for the conductive material may be formed by suitable manufacturing processes that may include depositing the conductive material on the substrate 51 and etching the pattern for the conductive material. Further, the diamond-shaped electrodes 52 that are arranged in vertical rows are connected to each other by a strip 53 of the transparent conductive material. Since it is desirable that the electrodes 54 that are arranged in horizontal rows do not come into direct electrical contact with the electrodes 52, and there is only a single layer of conductive material, the electrodes 54 in each horizontal row are not connected together by strips of the transparent conductive material. Further, similar to the prior art touch sensor assembly 10 shown in FIG. 1, the electrodes 52 and 54 that are positioned at the ends of a row are coupled to lead lines (e.g., lead lines 56), which may in turn be coupled to a controller (e.g., the control logic 36 shown in FIG. 2). The controller may be a custom made controller, or a touch controller offered by various manufacturers such as Cypress Semiconductor, Analog Devices, Atmel, Synaptics, and others. FIG. 3B illustrates the touch screen sensor assembly 50 that includes a plurality of connectors 64 that are operable to electrically couple adjacent electrodes 54 in each horizontal row so that all of the electrodes 54 may be electrically coupled to a controller through lead lines. To ensure that the connectors 64 do not electrically contact the vertical electrodes 52, patches of insulating material 58 may be positioned above the strips 53 that connect the vertical rows of electrodes 52. The insulating material 58 may be placed over the strips 53 by any manufacturing method, such as printing, spin coating then etching, or the like. The insulating material 58 may be configured form any suitable material, such as various organic and inorganic insulating materials. The connectors 64 are each coupled to the electrodes 54 at the connection points 62.

The connectors 64 are made of a transparent material that may be printed directly onto the surface of the assembly 50 without requiring any other process. For example, the connectors may be made of transparent, conductive carbon nanotubes.

Figure 4:
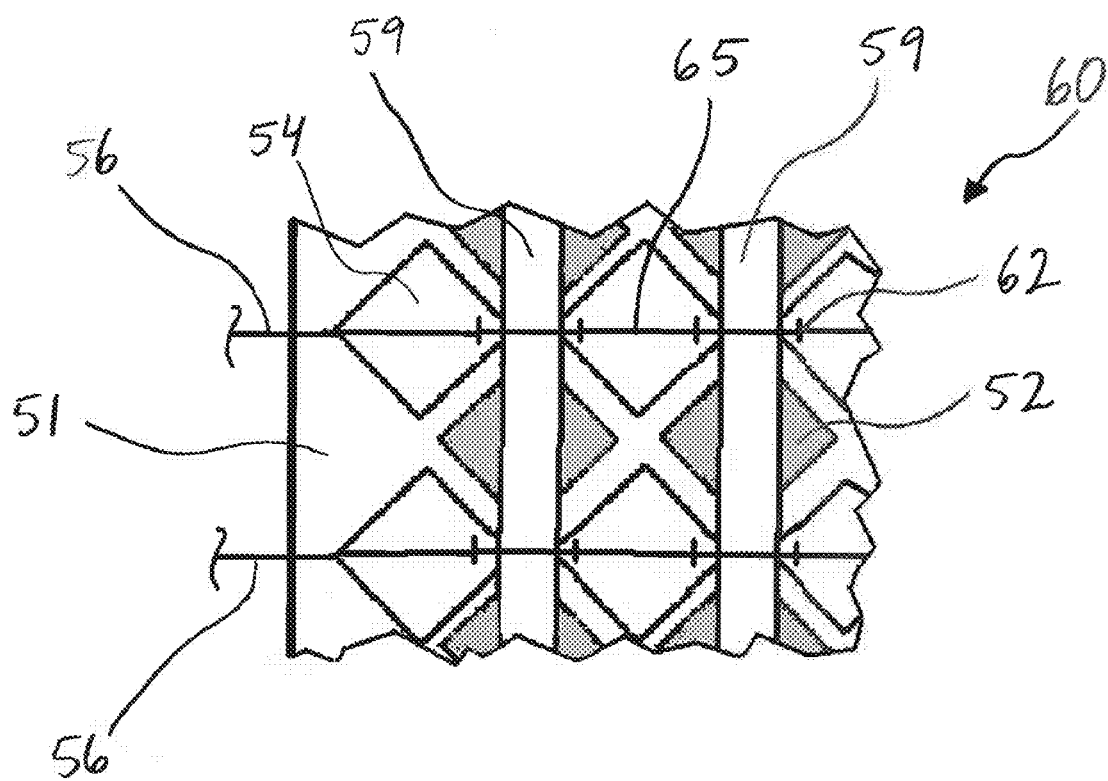
FIG. 4 illustrates another embodiment of an exemplary touch screen sensor assembly.

FIG. 4 illustrates another embodiment of an exemplary touch screen sensor assembly 60. In this embodiment, a plurality of strips 59 of insulating material is applied over the vertical rows of electrodes 52 and in between the electrodes 54 that are disposed in horizontal rows. This configuration may be desirable for a number of reasons, including the simplification of the manufacturing process. Also in this embodiment, a single connector 65 in each horizontal row functions to electrically couple an entire row of electrodes 54 together via connection points 62. This configuration may have the advantage of simpler manufacturing, and may also improve the touch sensitivity.

It should be appreciated that the features of the touch screen assemblies described herein provide several advantages. For example, providing an assembly with only a single layer of conductive material may reduce the cost and complexity of the manufacturing process. Further, using transparent carbon nanotubes for the connectors 64 and 65 may permit the width of the connectors to be greater than the width of another material that is less transparent (e.g., a metal), which may further reduce the cost of manufacturing, and reduce the electrical resistance of the connectors. Additionally, using a material that may be printed rather than etched for the connectors 64 and 65 may further reduce the cost and complexity of the manufacturing process. Those skilled in the art will readily recognize other advantages that are provided by the touch screen assemblies described and claimed herein.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A touch panel assembly comprising:
   a patterned layer of conductive material organized into a plurality of rows of conductive electrodes and a plurality of columns of conductive electrodes, wherein the conductive electrodes in each row of the plurality of rows are continuous, and the conductive electrodes in each column of the plurality of columns are discontinuous;
   an insulating material disposed over a portion of the conductive material that is at least part of one of the plurality of rows;
   a printable and conductive connector disposed over the insulating material and operable to electrically couple two conductive electrodes in one column of the plurality of columns together.

2. The touch panel assembly of claim 1, wherein the conductive material includes indium tin oxide (ITO).

3. The touch panel assembly of claim 1, wherein the printable and conductive connector includes carbon nanotubes.

4. The touch panel assembly of claim 1, wherein the conductive electrodes are substantially diamond shaped.

5. The touch panel assembly of claim 1, further comprising:
   a glass substrate, wherein the patterned layer of conductive material is disposed thereon.

6. The touch panel assembly of claim 1, further comprising:
   a plastic substrate, wherein the patterned layer of conductive material is disposed thereon.

7. The touch panel assembly of claim 1, further comprising:

a plurality of lead lines each coupled to one or more of the electrodes;
a controller coupled to the lead lines.

8. The touch panel assembly of claim 1, wherein the insulating material includes organic insulating material.

9. The touch panel assembly of claim 1, wherein the plurality of rows and the plurality of columns are substantially orthogonal to each other.

10. A method for manufacturing a touch panel assembly, the method comprising:
providing a substrate;
forming a layer of transparent conductive material on the substrate;
etching the conductive material to form a pattern that includes a plurality of rows that each include a plurality of electrodes, and a plurality of columns that each include a plurality of electrodes, wherein the plurality electrodes in each row of the plurality of rows are each coupled together by a strip of the conductive material, and wherein the plurality of electrodes in each column of the plurality of columns are not coupled together by the conductive material;
printing an insulating material aligned over at least a portion of each of the strips of the conductive material; and
printing an electrically conductive connector over at least a portion of the insulating material such that at least two of the electrodes are coupled together.

11. The method of claim 10, further comprising coupling a plurality of lead lines to a plurality of the electrodes.

12. The method of claim 11, further comprising coupling the plurality of lead lines to a controller.

13. The method of claim 10, wherein the electrically conductive connector includes carbon nanotubes.

14. The method of claim 10, wherein the conductive material includes indium tin oxide (ITO).

15. The method of claim 10, wherein the each row in the plurality of rows is substantially orthogonal to each column in the plurality of columns.

16. A touch panel assembly comprising:
a single patterned layer of conductive material that includes a plurality of electrodes, wherein at least two of the electrodes are not coupled together by the conductive material;
an insulating material disposed over a portion of the conductive material that connects two others of the electrodes together;
a printable and conductive connector disposed over the insulating material and operable to electrically couple two electrodes together.

17. The touch panel assembly of claim 16, wherein the conductive material includes indium tin oxide (ITO).

18. The touch panel assembly of claim 16, wherein the printable and conductive connector includes carbon nanotubes.

19. The touch panel assembly of claim 16, wherein the electrodes are substantially diamond shaped.

20. The touch panel assembly of claim 16, further comprising:
a glass substrate, wherein the patterned layer of conductive material is disposed thereon.

21. The touch panel assembly of claim 16, further comprising:
a plastic substrate, wherein the patterned layer of conductive material is disposed thereon.

22. The touch panel assembly of claim 16, further comprising:
a plurality of lead lines each coupled to one or more of the electrodes;
a controller coupled to the lead lines.

* * * * *